United States Patent

[11] 3,611,840

| [72] | Inventor | John P. Mentink |
| | | Longmeadow, Mass.; |
| | | John J. Mate |
| | | Fairfield, Conn. |
| [21] | Appl. No. | 46,769 |
| [22] | Filed | June 16, 1970 |
| [45] | Patented | Oct. 12, 1971 |
| [73] | Assignee | Hydromation Systems Inc., Westfield, Mass. |

[54] MOTION TRANSFER DEVICE CONSTRUCTION
6 Claims, 5 Drawing Figs.

[52] U.S. Cl. ............................................. 74/55;
72/481; 82/24
[51] Int. Cl. .................................................. F16h 25/08
[50] Field of Search ..................................... 74/53,
55; 82/19, 24; 72/462, 481

[56] References Cited
UNITED STATES PATENTS

| 2,301,642 | 11/1942 | Roddy | 74/55 |
| 2,898,814 | 8/1955 | Kinnaman | 74/55 X |
| 2,906,156 | 9/1959 | Wheeler | 74/53 X |
| 3,199,359 | 8/1965 | Beezer | 74/55 |

Primary Examiner—William F. O'Dea
Assistant Examiner—P. O. Ferguson
Attorney—Chapin, Neal and Dempsey ABSTRACT: Motion transfer device construction for precisely controlled high-speed linear output movement from a rotary drive input, having a housing on which an elongated tool slide bar block is slidably carried in exposed relation to provide a plurality of tool mounting positions, the bar being formed with longitudinal tool locating grooves and supported between V-shaped bearing guide blocks extending the full length of one face of said housing. A housing throughbore provides stepped shouldered portions in which a stepped drive shaft unit is seated by spaced roller bearings, a closed track face groove cam at the inner end of the shaft being thereby positionally located for driving engagement with a follower roll of the slide bar.

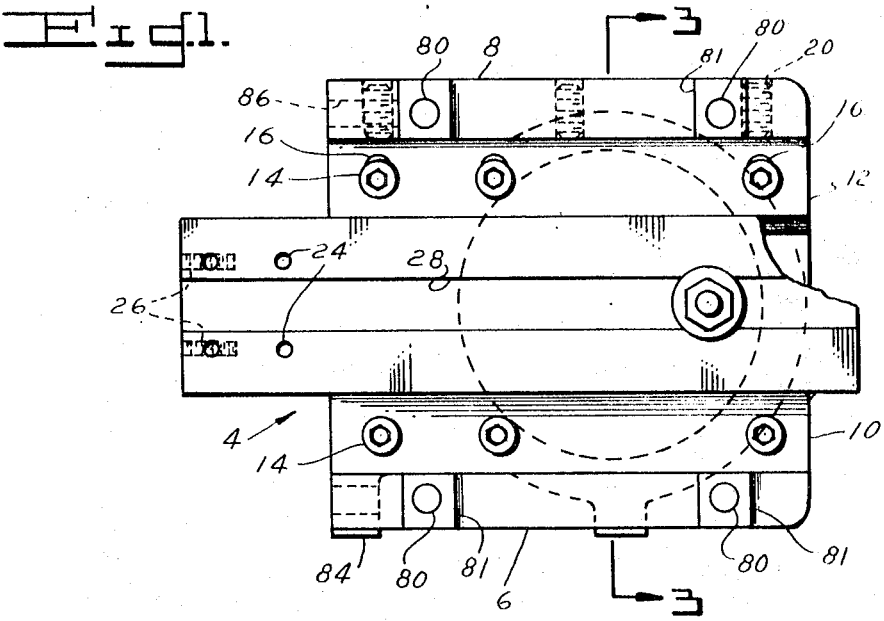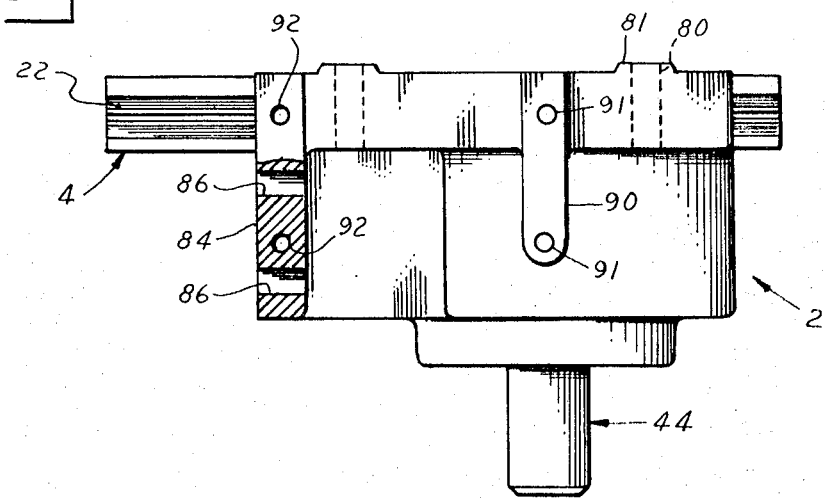

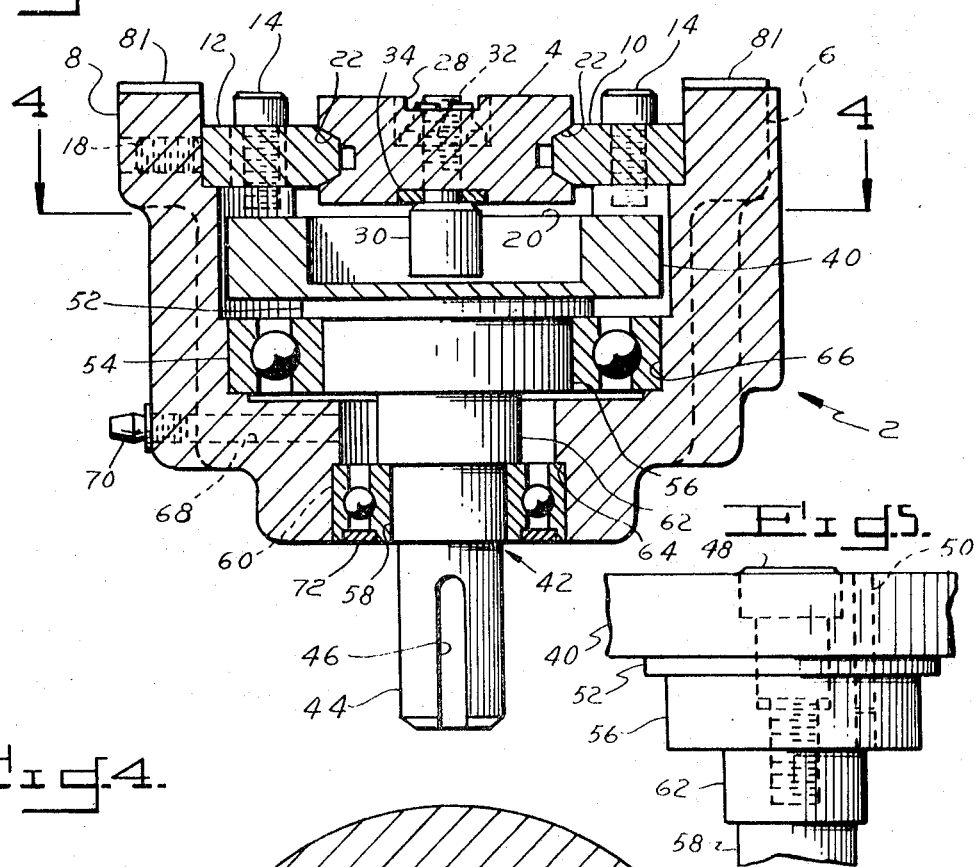
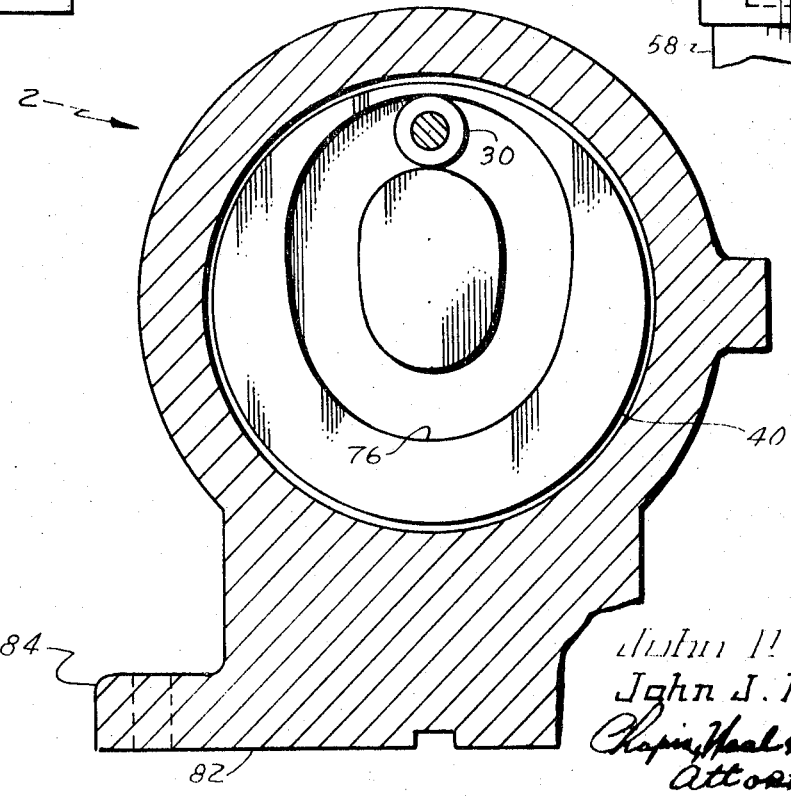

3,611,840

MOTION TRANSFER DEVICE CONSTRUCTION

BACKGROUND OF THE INVENTION

This invention relates to motion transmitting devices and particularly to a unit designed to impart a back and forth linear movement to a driven member from rotatable drive means.

More particularly, the invention is directed to a simple and compact construction for efficiently producing a precise and accurately controlled linear slide movement of a small magnitude (e.g. on the order of an inch or less), in a device of this type. Known in the trade as a transfer press, the device can be readily utilized in a wide variety of applications as, for example, where a translatory motion is desired for the movement of a workpiece-engaging tool mounted on the device for the transfer of successively advanced workpieces from one position to another, or, for an accurately timed advance of a working tool mounted on the device into operative engagement with workpieces which are presented in timed sequence at a given work station. Additional applications for the device will be readily apparent for use in any environment where a linear transfer movement is desired with precisely controlled acceleration characteristics and dwell periods at the end of each stroke.

Insofar as we are aware, prior devices producing linear movement from a rotary shaft means or otherwise, and available in the trade today for high-speed short stroke operations, have been found wanting because of some deficiency in one or more respects. The lack of an efficient device capable of the precise control required for the operation of certain transfer movements can thus impose limitations on the production rate of machinery which may otherwise be designed for very high speed operation. A device made according to the present invention has been found to operate successfully on a machine with the required degree of accuracy of slide movement and a precise deposit of parts at a rate of five pieces per second, and tests have further indicated the parts are not subject to an unduly rapid wear because of friction, a condition which has heretofore been commonly found in prior devices particularly those having a slide movable in a guideway and the rotary motion being transmitted through linkage connections.

The present invention is specifically directed to an assembly in which a housing encases a rotary face groove cam drive shaft sub-assembly, the input end of the shaft extending from one side of the housing and the face groove cam driving a linear slide bar or block lying exposed along the opposite side of the housing. The slide bar is provided with ways along its side edges for mounting between V-shaped bearing blocks extending the full length of the housing. The slide bar also projects outwardly beyond one end edge of the housing. The slide bar and drive sub-assembly may be made of extremely rugged construction. The slide and face cam are preferably of tool steel which may be suitably hardened to provide a maximum degree of control in precisely directing and controlling output movement. The V-bearings are preferably of oil-impregnated bronze for permanent lubrication and the bearing assembly is adjustable to take up wear and insure the precise linear path of travel. The slide bar may further be formed with a precisely dimensioned tool positioning groove disposed longitudinally along the center line of the bar, and the projecting end of the bar may also be provided with tapped holes in different planes, all for the ready mounting of a wide variety of tool attachments or a fast tool interchange, where desired, and without need for re-alignment. The housing also preferably has means for mounting the same in different planes relative to the slide bar path and thus can more easily be installed in suitable position with respect to any given support surface at a work station. Accordingly, the device is adapted to provide a modular unit for installation and service under a wide variety of conditions and generally eliminating a need for elaborate or specialized mounting bracket supports. The objects and many advantages of a transfer press device constructed according to the invention will be apparent from the following description of a preferred embodiment thereof as shown in the accompanying drawings.

DRAWINGS

FIG. 1 is a plan view, on a reduced scale, showing the side of the device on which a slide bar is mounted on the housing for movement between bearings and is exposed for tool attachment along the full length thereof;

FIG. 2 is an elevational view of another side of the device as seen from below the unit shown by FIG. 1;

FIG. 3 is a full scale sectional view taken substantially on line 3—3 of FIG. 1;

FIG. 4 is a sectional view taken on line 4—4 of FIG. 3; and

FIG. 5 is a detailed view showing the mounting of the face cam on the drive shaft.

In the drawings the housing of the device is indicated generally by numeral 2. One side or face of the housing (FIG. 1) is rectangular in outline and a tool mounting slide 4 is supported for movement in a linear path. The slide extends the full length of the housing face with one end projecting therebeyond and provided with tool attachment means at said end as will be described. The housing at this side is provided with flanged skirts at 6 and 8 (see also FIG. 3) along opposite edges thus providing a longitudinally recessed surface between the flanges. Seated inwardly adjacent the flanges and extending for the full length thereof are tool slide bearing blocks 10 and 12 secured to the housing as by the mounting bolts indicated at 14. At least one of the bearing blocks is formed with transverse mounting slots 16 receiving the bolts 14 as shown in bearing 12 so as to enable lateral adjustment thereof and to assure the desired bearing fit for the slide bar and also to take up wear. A plurality of set screw members as at 18 are threaded in spaced openings of flange 8 and provide a means for positively setting the bearings relative to the bar.

As best seen in FIG. 3 the slide bar 4 is movably supported for linear motion by and between the inner edges of the bearing blocks. The bar 4 along its side edges is provided with slots 22 of V-shaped formation, the contacting inner sides of the bearings having complementary converging surfaces for sliding engagement and support of the bar. As may be noted from FIG. 3 the seats for bearings 10 and 12 are shouldered portions of the housing, a recessed surface 20 therebetween providing clearance at the underside of bar 4.

The bearings are preferably of oil impregnated bronze for permanent lubrication. The bearings during back and forth travel of the slide bar are fully engaged over the entire length thereof for stability and precise control of slide bar movement. The projecting end of the bar has vertical mounting holes 24 and mounting holes 26 at right angles thereto opening at the end face of the bar. Accordingly, the attachment of a variety of tool mounting fixtures may be readily accommodated. On the longitudinal center line of slide 4 a groove 28 is also formed to receive suitable locating elements for tool mounting devices. The groove 28 is preferably precisely dimensioned for fast and accurate positioning of tool mounts, and also a rapid interchange of tooling may be accomplished where a sequence of successive operations is desired in the operation of the device. As shown the groove 28 extends for the full length of the tool slide and thus such locating means is available for mounting tool attachment purposes at any location along the length of the slide.

Adjacent the inner end of bar 4 a cam track follower roll 30 (FIG. 3) is fixed to extend inwardly of the housing and into the open end of a through bore in which the rotary drive means of the device is mounted. The mounting stem of roll 30 is secured in bar 4 as by a recessed nut at 32 threaded on the stem. A washer at 34 set in a circular recess at the underside of the bar positionally supports the roll 30 for engagement with the closed track of a face cam at the end of the rotary drive unit.

As shown by FIG. 3 the through bore of the housing 2 is of stepped cylindrical formation normal to the path of slide movement. The rotary drive shaft assembly actuating the bar includes a closed track face cam 40 removably fixed on the inner end of a unitary stepped drive shaft member 42, the other reduced end of the shaft at 44 extending outwardly of the housing and being provided with a keyway 46 for connection to a suitable driving mechanism.

The face cam 40 is secured to the drive shaft as by a shouldered screw bolt 48 centering the cam on the shaft. An eccentrically located dowel or "torque" pin 50 is also provided to accurately maintain the positional relation of cam and shaft and prevent any chance displacement (see FIG. 5) after repeated operations. Underlying and supporting the cam at the inner end of shaft 42 is a cylindrical flange portion 52 forming an annular shoulder against which an inner roller bearing 54 is seated on the adjacent bearing support section of the shaft at 56. A second bearing support section adjacent the outer projecting end 44 is at 58 on which an outer roller bearing 60 is seated against a shoulder provided by an intermediate stepped shaft section at 62.

The through bore at the input side of the housing is formed with a shouldered bearing seat at 64 for the outer roller bearing 60. An inner shouldered seat is at 66 and receives the inner bearing 54. The bearings being seated in oppositely facing shouldered portions of the bore positionally locate the shaft unit for engagement of the slide follower roll in the groove of the face cam. Opening into the reduced collar portion of the bore between the shouldered roller bearing seats is a passage at 68 having an inlet fitting 70 for injecting a suitable lubricant for the bearings, the outer bearing being provided with a conventional ring seal as indicated at 72.

The arrangement of parts as described and shown is extremely simple and compact and the slide bar and slide bearings for the linear movement are extremely sturdy and rugged in nature. The bearings lying along the exposed side of the housing support the bar for the full length of the housing and thereby provide a precisely controlled accuracy of movement during each stroke. The slide bar may be made of tool steel with hardened ways for the bearings. The cam is preferably made of hardened tool steel to insure positive and accurate movement at all times by a tight engagement of the slide follower roll in the cam track. Preferably the follower comprises a standard type of caged needle bearing. The track of the face groove cam determines the motion of the slide bar and may thus be formed with an appropriate curvature or configuration to impart a desired movement. Any type of cam curve profile may be utilized including acceleration curves such as modified trapezoidal configurations with zero acceleration at the beginning and end of each stroke. In transfer devices the ability to permit an accurately controlled dwell period at the end of each stroke is particularly desirable since the positioning of individual parts at the end of each transfer movement requires a dwell in order for the parts to settle without "bouncing." And with an accurately controlled acceleration pattern the desired high speed operation may be obtained. In FIG. 4 a representative cam track profile is shown at 76. The follower 30 is in its retracted position and it will be appreciated that the stroke of the follower and thus the slide along the center line thereof is about one half inch in length.

As previously mentioned the housing is provided with mounting means for support in different planes. In FIG. 1 the flanged skirts 6 and 8 have mounting bolt holes 80 adjacent each end thereof opening onto mounting pads 81 (see also FIG. 3). Thus the housing may be anchored to a support surface where it is convenient for the slide bar to lie in an adjacent planar relation to the support.

In FIGS. 1 and 4 it will be noted that the housing 2 is formed with a section laterally offset from the through bore and that the end wall thereof at 82 (FIG. 4) lies in a plane at right angles to the slide bar. The wall 82 is formed with flanges 84 at opposite sides in which mounting bolt holes 86 are provided for anchoring the housing with wall 82 facing the support surface.

In FIG. 2 is shown the means for mounting the unit in still another planar position at right angles to the slide bar and to wall 82. At one side of the housing section in which the through bore is formed a projecting rib 90 is provided with mounting bolt holes 91 drilled therein for cooperation with corresponding bolt holes 92 in the flange 84 at the same side of the housing. The unit may thus be anchored on a support or mounting bracket along this side of the housing.

The adaptability for utilizing the unit in numerous ways will be apparent from the above description. The transfer device can be used in mechanization processes wherever a high degree of reliability is required for precise linear motion. Units of the present invention can be coupled for parallel movements of shafts or platens. Other uses include transfer motions, escapements, insertion heads for assembling parts and components, positioning of shafts, shuttles and many other applications where controlled high speed operation is desired for staking, punching or light press operations and the like.

What is claimed is:
1. A motion transfer device construction comprising
  a housing having one face provided with flanges disposed along opposite side edges and having a longitudinally recessed surface between said flanges,
  bearing blocks seated in the recess adjacent said flanges and a tool slide bar held thereby, said blocks and bar having slidably interfitting edges supporting the bar for linear travel,
  at least one of said blocks being laterally adjustable and the slide bar extending the full length of said recess, the outer exposed surface of the bar having tool positioning means formed therein along its length and one end of the bar being provided with tool mounting holes and projecting outwardly of one end of the housing,
  said housing having a through-bore normal to said slide provided with stepped shouldered portions, said slide diametrically overlying the end of the bore and having a cam follower roll extending inwardly thereof,
  a rotary drive shaft having stepped shouldered portions with spaced roller bearings seated thereon and in said bore and positionally locating the shaft, a face groove cam fixed on the inner end of said drive shaft and having a closed track engaging said slide follower roll, the outer input end of the shaft extending from the housing for connection to rotary drive means, and
  means on the housing for anchoring said device to a support.
2. A motion transfer device construction as set forth in claim 1 in which
  said slide bar is rectangular in cross section and the side edges thereof are provided with longitudinal V-shaped grooves, and
  said bearing blocks extend the full length of the recess, the inner bearing edges of the blocks being V-shaped in form slidably fitting in said slide bar grooves and engaging the bar for controlled linear movement.
3. A motion transfer device construction as set forth in claim 2 in which
  said tool positioning means of the slide bar includes a grooved recess of precision dimensions along the longitudinal center line of the bar.
4. A motion transfer device construction as set forth in claim 3 in which
  the flanges of said recessed face are provided with means for mounting the housing for travel of the slide bar in a path lying in adjacent parallel relation to the plane of a support surface for the housing,
  the end of said housing from which said slide bar projects also has side flanges provided with means for mounting the housing for slide bar travel in a path perpendicular to and intersecting the plane of a support surface for the housing, and
  the housing is further provided with mounting means disposed for support of the housing in a planar relationship perpendicular to the support plane defined by each of said other mounting means.

5. A motion transfer device construction as set forth in claim 4, in which, the outer of said roller bearings of the shaft is seated in an outwardly facing seat at the end of the bore adjacent said shaft input end, said bearing having a lubricant seal at its outer side, and the inner of said roller bearings spaced therefrom is seated in an oppositely facing seat, said housing having a lubricant passage communicating with the portion of the bore between said seats.

6. A motion transfer device construction as set forth in claim 5, in which, said bearing blocks are oil impregnated bronze bearings.

said face cam and follower members are of hardened tool steel composition and said slide bar is of tool steel with at least the sides thereof hardened to provide hardened ways receiving said bearing edges.